(12) United States Patent
Glovier et al.

(10) Patent No.: US 12,564,119 B2
(45) Date of Patent: Mar. 3, 2026

(54) AGRICULTURAL SYSTEM AND METHOD FOR MONITORING OPERATING CONDITIONS ASSOCIATED WITH DISKS OF AN AGRICULTURAL IMPLEMENT

(71) Applicant: CNH Industrial America LLC, New Holland, PA (US)

(72) Inventors: Scott Glovier, Lombard, IL (US); Sven N. Setterdahl, Maquon, IL (US)

(73) Assignee: CNH Industrial America LLC, New Holland, PA (US)

( * ) Notice: Subject to any disclaimer, the term of this patent is extended or adjusted under 35 U.S.C. 154(b) by 699 days.

(21) Appl. No.: 17/883,928

(22) Filed: Aug. 9, 2022

(65) Prior Publication Data

US 2024/0049614 A1    Feb. 15, 2024

(51) Int. Cl.
*A01B 61/04* (2006.01)
*A01B 63/111* (2006.01)

(52) U.S. Cl.
CPC ............ *A01B 61/04* (2013.01); *A01B 63/111* (2013.01)

(58) Field of Classification Search
CPC ................... A01B 61/04; A01B 63/111–1145
See application file for complete search history.

(56) References Cited

U.S. PATENT DOCUMENTS

| | | |
|---|---|---|
| 3,814,188 A | 6/1974 | Ahne |
| 4,979,092 A | 12/1990 | Bergene et al. |
| 5,339,906 A | 8/1994 | Fox et al. |

| | | | |
|---|---|---|---|
| 9,227,478 B2 | 1/2016 | Horstman | |
| 9,271,439 B2 | 3/2016 | Bourgault et al. | |
| 9,519,861 B1 | 12/2016 | Gates et al. | |
| 10,172,273 B2 | 1/2019 | Gschwendtner et al. | |
| 11,142,892 B2 | 10/2021 | Sherlock | |
| 11,182,521 B2 * | 11/2021 | Nizami et al. ........ | G06T 11/001 |
| 2008/0257569 A1 | 10/2008 | Foster et al. | |

(Continued)

FOREIGN PATENT DOCUMENTS

| | | |
|---|---|---|
| CN | 213874935 | 8/2021 |
| EP | 3905109 | 11/2021 |

OTHER PUBLICATIONS

Aykas et al., "The Effect of Tillage Parameters on the Performance of the Heavy Duty Offset Disk Harrow," Asian Journal of Plant Sciences, 3: 425-428, 2004 (5 pages) https://scialert.net/fulltext/?doi=ajps.2004.425.428.

*Primary Examiner* — Tara Mayo
(74) *Attorney, Agent, or Firm* — Dority & Manning. P.A.

(57) ABSTRACT

An agricultural system for monitoring operating conditions associated with disks of an agricultural implement may include a support mount supported relative to a frame member, with the support mount having a first mounting portion and a second mounting portion at least partially spaced apart from each other. Further, the system may include a support member supported relative to the frame member by the support mount, with the support member being positioned between the first and second mounting portions. Moreover, the system may include a shaft supported relative to the frame member by the support member and a ground engaging disk supported on the shaft. Additionally, the system may include a load sensor supported by one of the first mounting portion or the second mounting portion, with the load sensor being configured to generate data indicative of a load on the support member.

19 Claims, 6 Drawing Sheets

(56) References Cited

U.S. PATENT DOCUMENTS

| | | |
|---|---|---|
| 2018/0220574 A1 | 8/2018 | Peterson et al. |
| 2021/0029865 A1* | 2/2021 | Smith et al. ............. A01B 5/04 |
| 2021/0045278 A1* | 2/2021 | Henry ................... A01B 9/003 |
| 2021/0112699 A1* | 4/2021 | Stanhope et al. ...... A01C 5/064 |
| 2021/0131856 A1 | 5/2021 | Henry |
| 2021/0136995 A1 | 5/2021 | Barrick et al. |
| 2021/0153418 A1 | 5/2021 | Lupu et al. |
| 2021/0345536 A1 | 11/2021 | Bich et al. |
| 2023/0284546 A1* | 9/2023 | Wonderlich et al. ........................ A01B 63/1112 |

* cited by examiner

AGRICULTURAL SYSTEM AND METHOD FOR MONITORING OPERATING CONDITIONS ASSOCIATED WITH DISKS OF AN AGRICULTURAL IMPLEMENT

FIELD OF THE INVENTION

The present disclosure relates generally to agricultural implements that include disks and, more particularly, to monitoring operating conditions associated with disks of agricultural implements.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging tools configured to engage the soil as the implement is moved across the field. For example, in certain configurations, the implement may include one or more disk harrows, leveling disks, rolling baskets, shanks, tines, and/or the like. Such ground engaging tool(s) loosen and/or otherwise agitate the soil to prepare the field for subsequent planting operations.

During tillage operations, field materials, such as residue, soil, rocks, and/or the like, may become trapped or otherwise accumulate between adjacent ground engaging tools. Such accumulations of field materials may inhibit the operation of the ground engaging tools in a manner that prevents the tools from providing adequate tillage to the field. In such instances, it is necessary for the operator to take certain corrective actions to remove the material accumulation. However, it may be difficult for the tillage implement operator to determine when material accumulation occurs between the ground engaging tools. Additionally, it may be difficult for the operator to monitor obstacle impact events, such as when a ground engaging tool hits a rock, which may contribute to wear, and potential failure, of one or more components associated with the implement.

Accordingly, an agricultural system and method for monitoring operating conditions associated with ground engaging tools of agricultural implements, particularly associated with ground engaging disks of agricultural implements, would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural system for monitoring operating conditions associated with disks of an agricultural implement. The system may include a frame member and a support mount supported relative to the frame member, with the support mount having a first mounting portion and a second mounting portion, where the first and second mounting portions are at least partially spaced apart from each other in a first direction such that a gap is defined between the first and second mounting portions. Further, the system may include a support member supported relative to the frame member by the support mount, with the support member being positioned in the gap defined between the first and second mounting portions. Moreover, the system may include a shaft supported relative to the frame member by the support member and a ground engaging disk supported on the shaft. Additionally, the system may include a load sensor supported by one of the first mounting portion or the second mounting portion of the support mount, with the load sensor being configured to generate data indicative of a load on the support member.

In another aspect, the present subject matter is directed to an agricultural method for monitoring operating conditions associated with disks of an agricultural implement. The agricultural implement may include a frame member and a support mount supported relative to the frame member, with the support mount having a first mounting portion and a second mounting portion at least partially spaced apart from the first mounting portion in a first direction such that a gap is defined between the first and second mounting portions. The agricultural implement may further include a support member positioned in the gap and supported relative to the frame member by the support mount, and a ground engaging disk supported relative to the frame member by the support member. The method may include receiving, with a computing system, data generated by a load sensor supported by one of the first mounting portion or the second mounting portion of the support mount, the data being indicative of a load on the support member. Moreover, the method may include determining, with the computing system, an operating condition associated with the ground engaging disk based at least in part on the data generated by the load sensor. Additionally, the method may include initiating, with the computing system, a control action based at least in part on the operating condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

3

Figure 4:
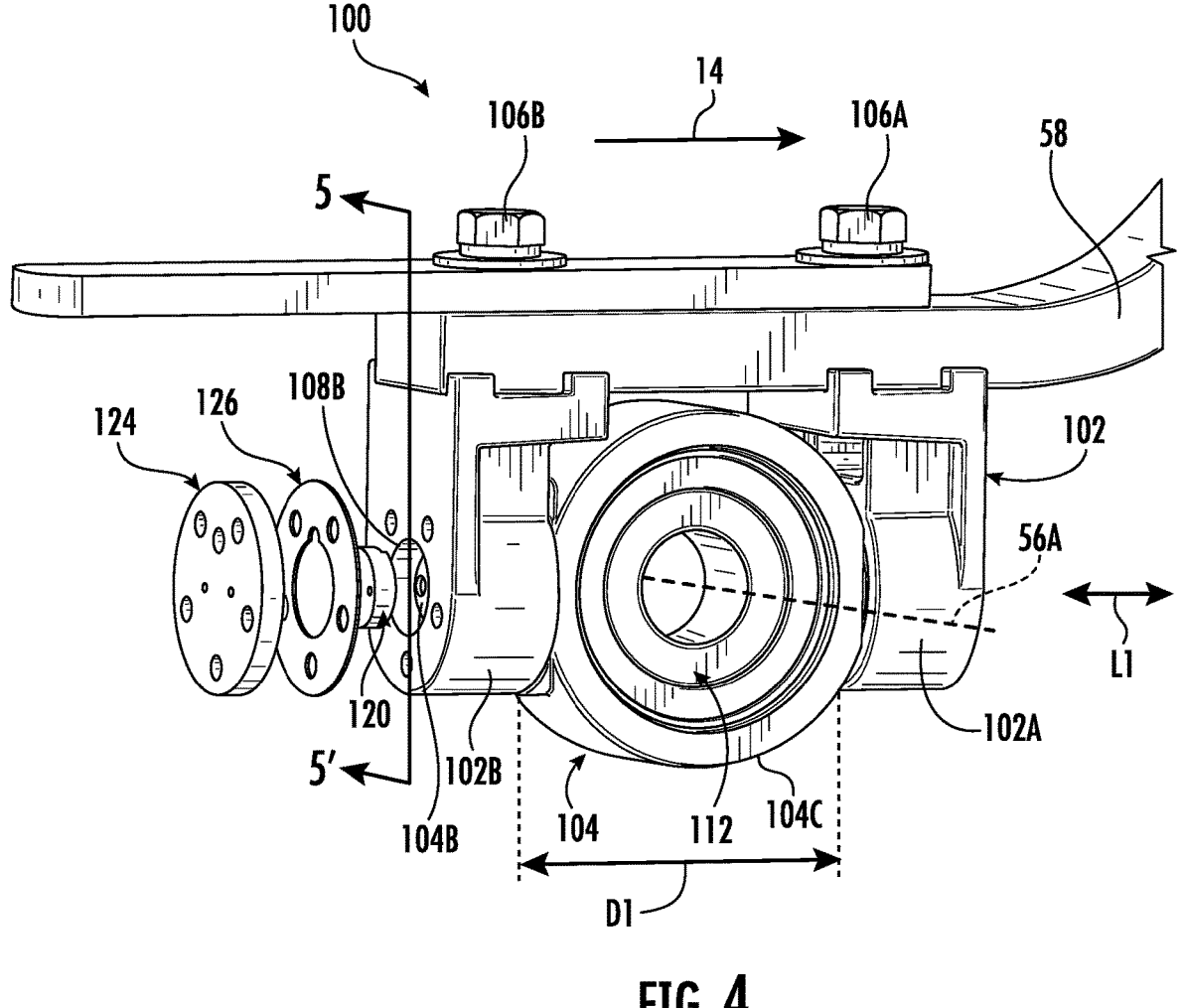
FIG. 4 illustrates a partially exploded, perspective view of a support assembly for supporting the disk gang assembly in accordance with aspects of the present subject matter.
Figures 5, 6:
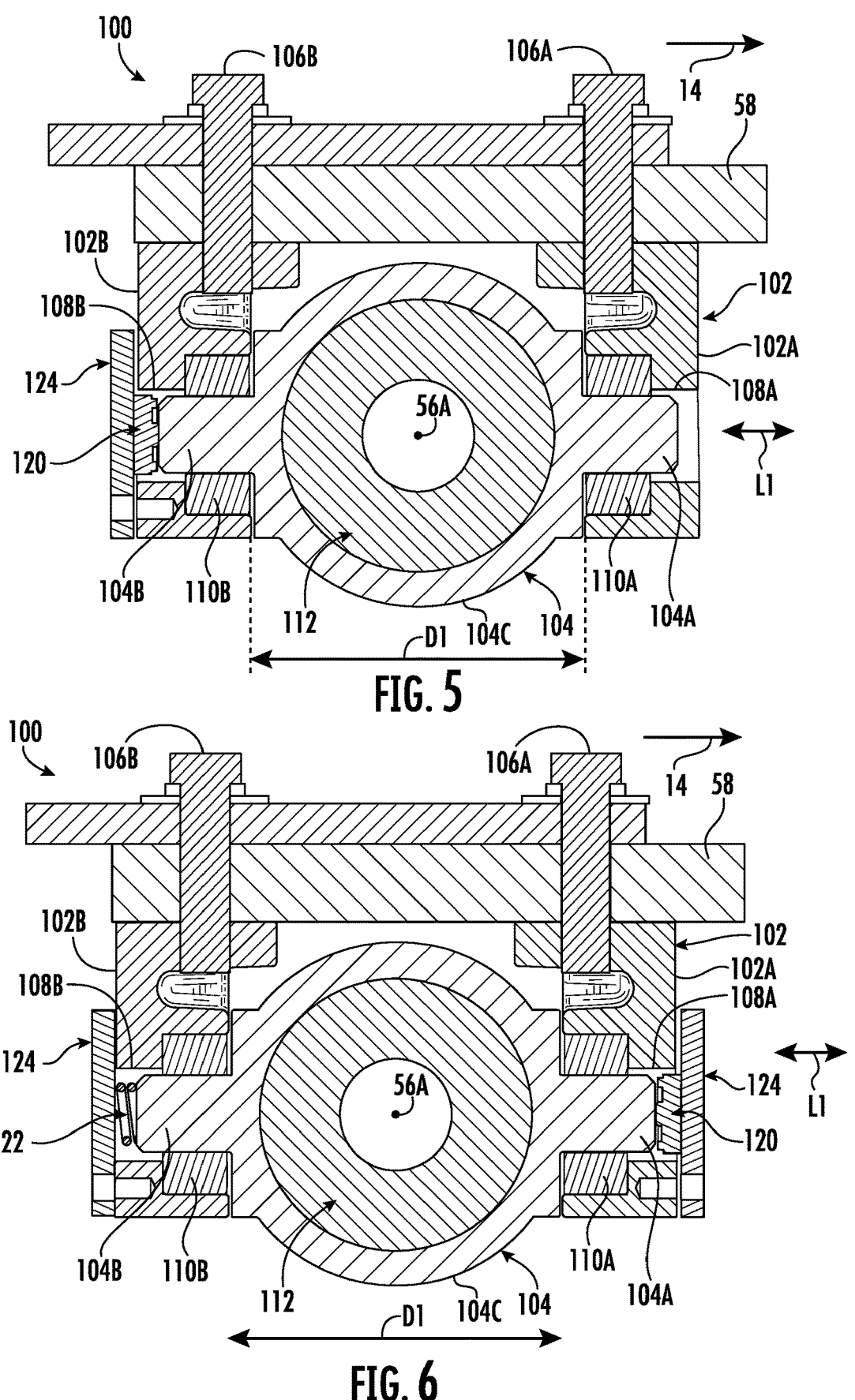
FIG. 5 illustrates a section view of the support assembly shown in FIG. 4 taken at section like 5-5' of FIG. 4 in accordance with aspects of the present subject matter, particularly illustrating a load sensor on a rear side of the support assembly.
Figure 7:
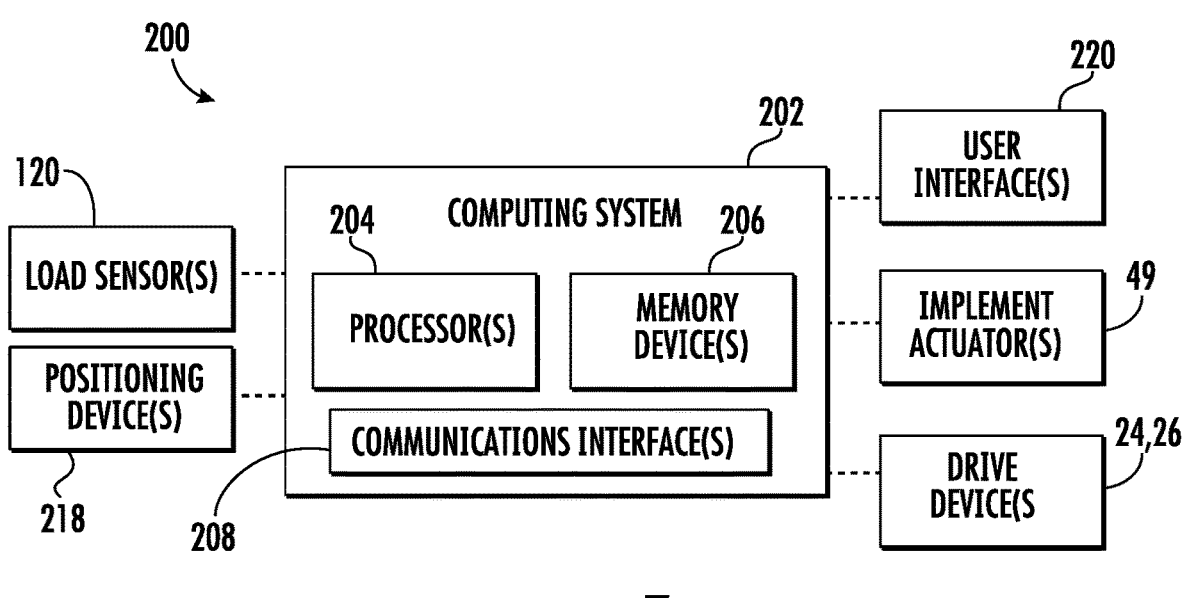
Figure 8:
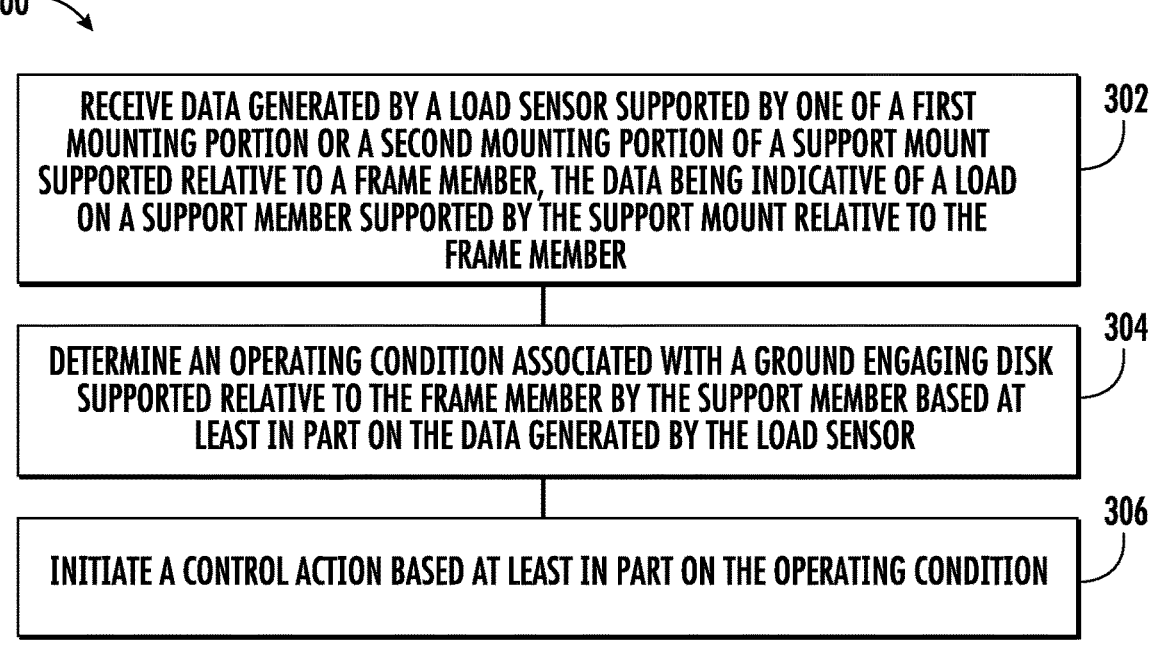

FIG. 6 illustrates another section view of the support assembly shown in FIG. 4 taken at section like 5-5' of FIG. 4 in accordance with aspects of the present subject matter, particularly illustrating a load sensor on a front side of the support assembly;

FIG. 7 illustrates a schematic view of a system for monitoring operating conditions associated with disks of an agricultural implement in accordance with aspects of the present subject matter; and FIG. 8 illustrates a flow diagram of one embodiment of a method for monitoring operating conditions associated with disks of an agricultural implement in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to agricultural systems and methods for monitoring operating conditions associated with disks of an agricultural implement. Specifically, in several embodiments, one or more ground-engaging disks are supported on a shaft, where the shaft, in turn, is supported by at least one support assembly relative to a frame member of the agricultural implement. For instance, in one embodiment, each support assembly includes a hanger coupled to the frame member, a support mount supported relative to the frame member by the hanger, and a support member supported relative to the frame member by the support mount, with the shaft being supported relative to the frame member by the support member. More particularly, the support mount has two mounting portions spaced apart from each other such that a gap is defined between the two mounting portions, with the support member being supported within the gap by the support mount. In accordance with aspects of the present subject matter, a load sensor is supported by one of the two mounting portions of the support mount and is configured to generate data indicative of a load applied on the support member by ground engaging disk(s), where the load is at least partially in the first direction.

A computing system of the disclosed system may be configured to monitor the data generated by the load sensor and determine an operating condition associated with the disk(s) based on the data, such as whether the disk(s) are plugged, have impacted an obstacle (e.g., a rock), and/or the like. For instance, the computing system may monitor a magnitude of the load and/or a duration of load to determine the operating condition(s) associated with the disk(s). The computing system may further be configured to initiate a control action, such as controlling a user interface to notify an operator of the operating condition(s), controlling one or more implement actuator(s) to improve the operating condition(s), and/or controlling one or more drive device(s) to improve the operating condition(s).

As such, the described system and associated method allow different operating conditions associated with the disks of an agricultural implement to be determined automatically, without an operator having to manually check the disks, which saves the operator time and may prevent the implement from being operated with an impaired condition. Further, automatic adjustments may be made to mitigate the operating conditions, which may additionally save the operator time and allow impaired conditions to be immediately addressed.

Figure 1:
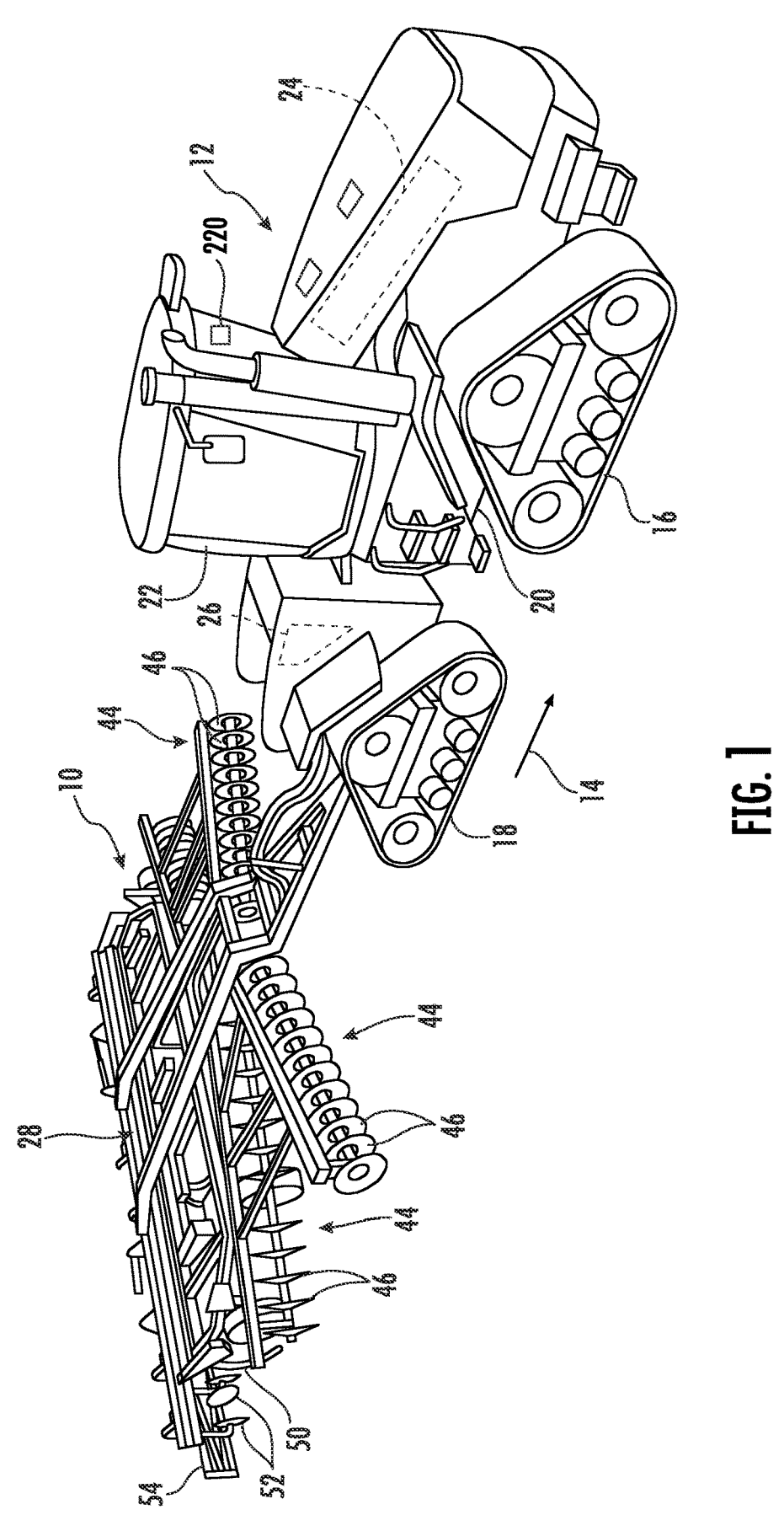
FIG. 1 illustrates a perspective view of one embodiment of an agricultural implement coupled to a work vehicle in accordance with aspects of the present subject matter.
Figure 2:
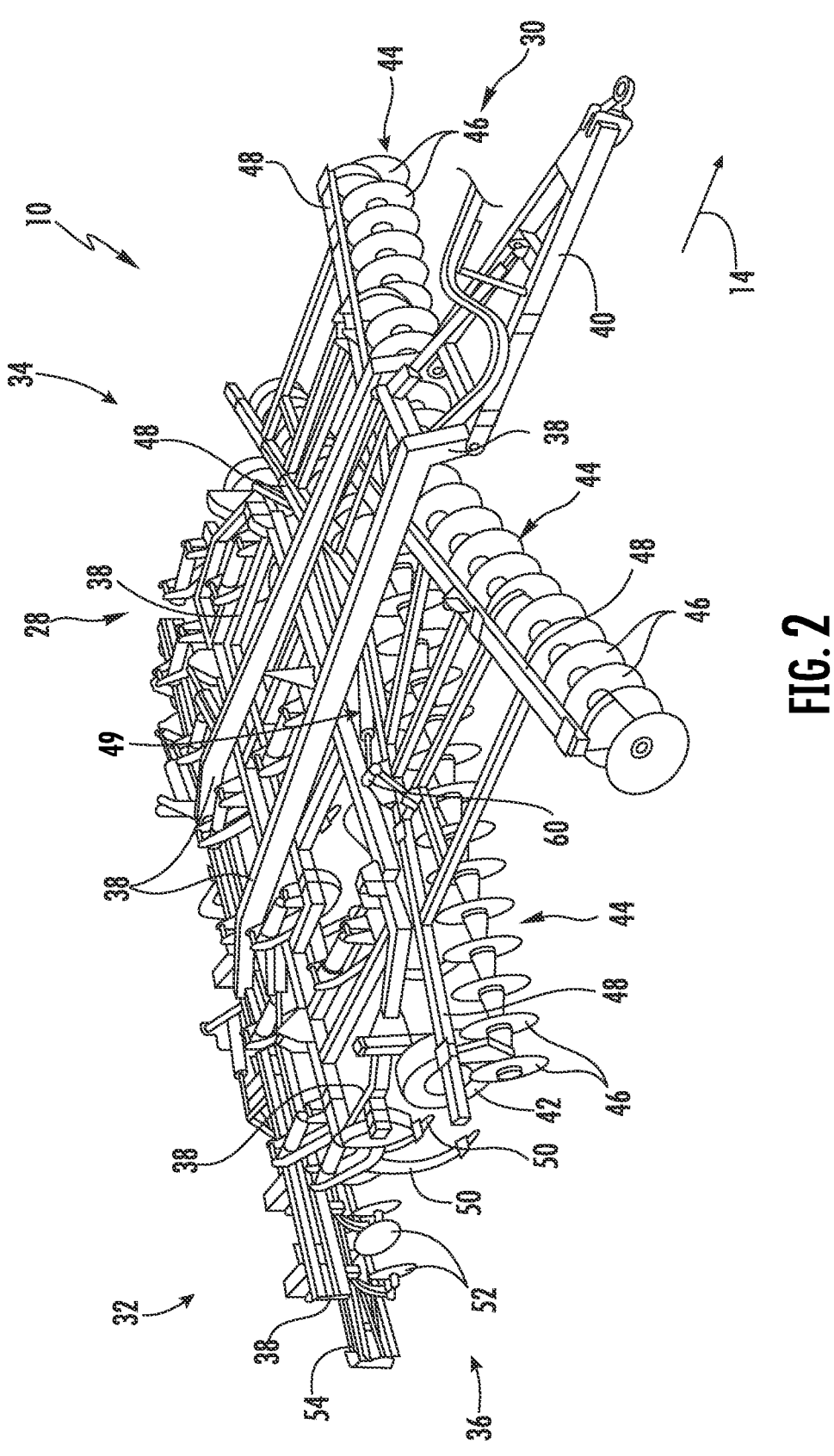
FIG. 2 illustrates an alternative perspective view of the agricultural implement in accordance with aspects of the present subject matter, particularly illustrating various ground engaging assemblies of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 220) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, as shown in FIG. 2, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (only one of which is shown in FIG. 2) may be coupled to the frame 28 to facilitate towing the implement 10 in the direction of travel 14.

In several embodiments, one or more ground engaging tools may be coupled to and/or supported by the frame 28. In such embodiments, the ground engaging tool(s) may, for example, include one or more ground-penetrating tools.

More particularly, in certain embodiments, the ground engaging tools may include one or more disk blades 46 and/or one or more shanks 50 supported relative to the frame 28. In one embodiment, each disk blade 46 and/or shank 50 may be individually supported relative to the frame 28. Alternatively, one or more groups or sections of the ground engaging tools may be ganged together to form one or more ganged tool assemblies, such as the disk gang assemblies 44 shown in FIGS. 1 and 2.

As illustrated in FIG. 2, each disk gang assembly 44 includes a toolbar 48 coupled to the implement frame 28 and a plurality of disk blades 46 supported by the toolbar 48 relative to the implement frame 28. Each disk blade 46 may, in turn, be configured to penetrate into or otherwise engage the soil as the implement 10 is being pulled through the field. As is generally understood, the various disk gang assemblies 44 may be oriented at an angle relative to the direction of travel 14, such that an axis of rotation of the disks is not perpendicular to the direction of travel 14, to promote more effective tilling of the soil. However, it should be appreciated that the disk gang assemblies 44 may be oriented in any other suitable manner relative to the direction of travel 14. In the embodiment shown in FIGS. 1 and 2, the implement 10 includes four disk gang assemblies 44 supported on the frame 28 at a location forward of the shanks 50, adjacent to the forward end 30 of the implement 10, such as by including two forward disk gang assemblies 44 and two rear disk gang assemblies 44. However, it should be appreciated that, in alternative embodiments, the implement 10 may include any other suitable number of disk gang assemblies 44, such as more or fewer than four disk gang assemblies 44. Furthermore, in one embodiment, the disk gang assemblies 44 may be mounted to the frame 28 at any other suitable location, such as adjacent to aft end 32 of the implement 10.

Moreover, in several embodiments, the implement 10 may include a plurality of disk gang actuators 49 (one is shown in FIG. 2), with each actuator 49 being configured to move or otherwise adjust the orientation or position of one or more of the disk gang assemblies 44 relative to the implement frame 28. For example, a first end of each actuator 49 may be coupled to a toolbar 48 of the corresponding disk gang assembly 44, while a second end of each actuator 49 may be coupled to the frame 28. Each actuator 49 may be configured to extend and/or retract to adjust the angle of the corresponding disk gang assembly 44 relative to a lateral centerline (not shown) of the frame 28 and/or the penetration depth of the associated disk blades 46. Furthermore, each actuator 49 may be configured to extend and/or retract to adjust a downforce applied by the actuator(s) 49 to the disk gang assembly 44, and thus the disk blades 46. In the illustrated embodiment, each actuator 49 corresponds to a fluid-driven actuator, such as a hydraulic or pneumatic cylinder. However, it should be appreciated that each actuator 49 may correspond to any other suitable type of actuator, such as an electric linear actuator.

It should be appreciated that, in addition to the shanks 50 and the disk blades 46, the implement frame 28 may be configured to support any other suitable ground engaging tools. For instance, in the illustrated embodiment, the frame 28 is also configured to support a plurality of leveling blades 52 and rolling (or crumbler) basket assemblies 54. In other embodiments, any other suitable ground engaging tools may be coupled to and supported by the implement frame 28, such as a plurality of closing disks.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
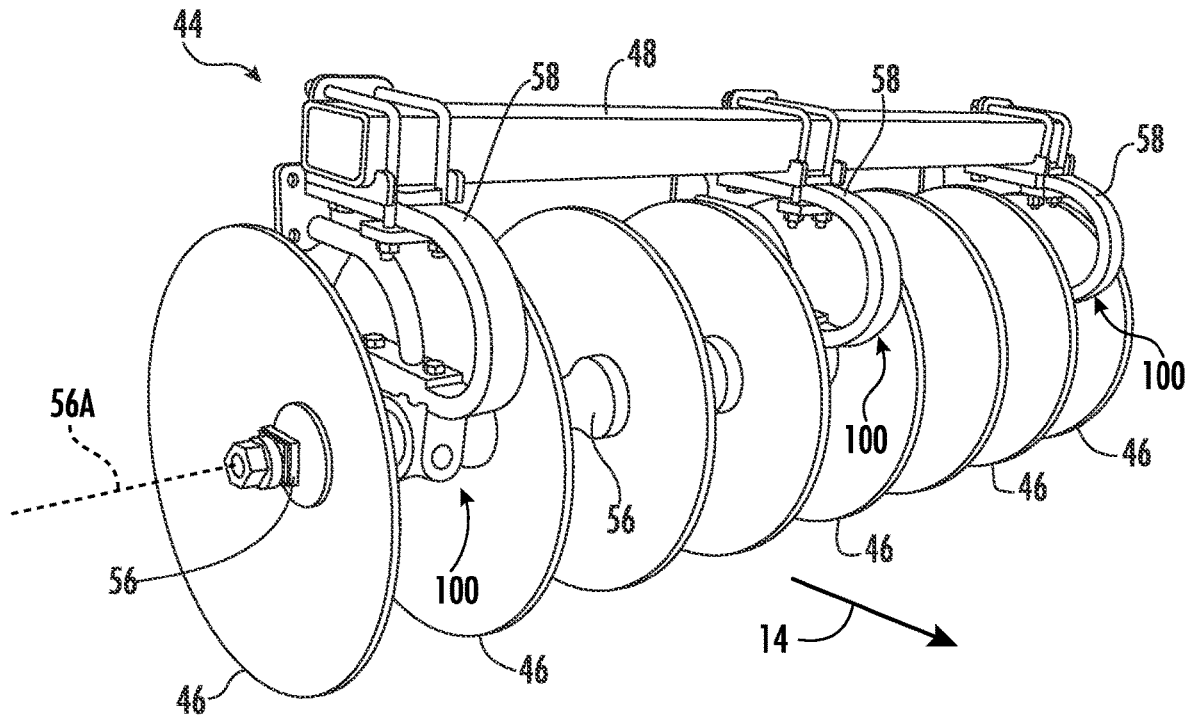
FIG. 3 illustrates a perspective view of a ganged tool assembly of the implement in accordance with aspects of the present subject matter, particularly illustrating the ganged tool assembly configured as a disk gang assembly of the tillage implement.

Referring now to FIG. 3, one example implementation of a disk gang assembly 44 described above in reference to FIGS. 1 and 2 is illustrated in accordance with aspects of the present subject matter. Specifically, FIG. 3 illustrates a perspective view of various components of the disk gang assemblies 44 of the implement 10 described above with reference to FIGS. 1 and 2. However, it should be appreciated that the aspects of disk gang assembly 44 described herein with reference to FIG. 3 may also be utilized with any other ganged tool assembly including any other suitable ground engaging tools of a given agricultural implement 10, such as individually mounted disks.

As shown in FIG. 3, the disk gang assembly 44 may include a plurality of disk blades 46 rotatably coupled to and spaced apart along the length of a disk gang shaft 56. The disk gang shaft 56 may, in turn, be coupled to the toolbar 48 of the disk gang assembly 44 via one or more support assemblies 100. For instance, as will be described in greater detail below, each of the support assemblies 100 includes a hanger 58 coupled at one end to the toolbar 48 and at the opposite end to the disk gang shaft 56. In the illustrated embodiment, each of the hangers 58 defines a C-shape that permits the disk gang shaft 56 and the disk blades 46 mounted thereon to move relative to the toolbar 48. However, it should be appreciated that, in alternative embodiments, the hanger(s) 58 may have any other suitable configuration. The disk blades 46 (alternatively referred to herein as "disks 46") are generally configured to rotate about an axis 56A defined by the shaft 56. In one embodiment, the disks 46 are "keyed" to the shaft 56 such that all of the disks 46 rotate together about the axis 56A with the shaft 56. However, in other embodiments, the disks 46 may be allowed to rotate independently about the axis 56A relative to the shaft 56. It should additionally be appreciated that while the disk gang assembly 44 is shown as having three support assemblies 100 in FIG. 3, the disk gang assembly 44 may have any other suitable number of support assemblies 100, such as two, four, five or more support assemblies 100.

Turning now to FIGS. 4-6, various views of a support assembly 100 suitable for use with the disk gang 44 in FIG. 3 are illustrated in accordance with aspects of the present subject matter. More particularly, FIG. 4 illustrates a partially exploded, perspective view of a support assembly for supporting the disk gang assembly, and FIGS. 5 and 6 illustrate section views of the support assembly shown in FIG. 4 taken at section like 5-5' of FIG. 4.

As shown in FIGS. 4-6, the support assembly 100 includes a support mount 102 coupled to the hanger 58, and a support member 104 supported relative to the hanger 58 by the support mount 102. More particularly, the support mount 102 includes a first mounting portion 102A and a second mounting portion 102B. The first and second mounting portions 102A, 102B are spaced apart by a distance D1 in a first direction L1 such that a gap is defined between the first and second mounting portions 102A, 102B in the first direction L1. The first direction L1 may be at an angle relative to the direction of travel 14 when the axis 56A of the disk gang 44 is not perpendicular to the direction of travel 14 (as shown in FIGS. 1 and 2). However, it should be appreciated that the first direction L1 may be parallel to the direction of travel 14 when the axis 56A of the disk gang 44 is perpendicular to the direction of travel 14. The second mounting portion 102B is generally rearward of the first mounting portion 102A relative to the direction of travel 14.

In one embodiment, such as the embodiment shown, the first and second mounting portions 102A, 102B are discrete parts, separately coupled to the hanger 58 by fastening elements 106A, 106B (e.g., screws, bolts, rivets, etc.) or by any other means (e.g., welding, soldering, etc.). However, it should be appreciated that, in other embodiments, the first and second mounting portions 102A, 102B are portions of a unitary part which is coupled to the hanger 58. It should additionally be appreciated that, in one embodiment, the first and second mounting portions 102A, 102B collectively define or form a trunnion mount.

Each of the first and second mounting portions 102A, 102B defines a respective opening extending along the first direction L1. For instance, the first mounting portion 102A includes a first channel or opening 108A (FIGS. 4 and 5) and the second mounting portion 102B includes a second channel or opening 108B. In one embodiment, the openings 108A, 108B are aligned along the first direction L1, such that the axes of the openings 108A, 108B are essentially coincident and parallel to each other. However, it should be appreciated that, in other embodiments, the openings 108A, 108B may be aligned relative to each other in any other suitable manner.

The support member 104 may generally be configured to support the disk gang shaft 56 (FIG. 3) relative to the implement frame member (e.g., toolbar 48 (FIGS. 2-3)). For instance, the support member 104 is supported relative to the toolbar 48 by the support mount 102. More particularly, the support member 104 is positioned at least partially within the gap defined between the first and second mounting portions 102A, 102B of the support mount 102. The support member 104 may be supported by the support mount 102 by being at least partially received within the openings 108A, 108B defined by the first and second mounting portions 102A, 102B. For instance, as particularly shown in FIGS. 5 and 6, the support member 104 may be configured as a trunnion. For example, the support member 104 may have a central body 104C, a first protrusion 104A, and a second protrusion 104B, where the second protrusion 104B extends opposite the first protrusion 104A about the central body 104C. The first protrusion 104A may be received within the first opening 108A of the first mounting portion 102A and the second protrusion 104B may be received within the second opening 108B of the second mounting portion 102B when the central body 104C is received within the gap between the first and second mounting portions 102A, 102B.

Further, the support member 104 may be supported on the support mount 102 by one or more bearings of the support assembly 100. For instance, a first bearing 110A may be configured to receive the first protrusion 104A and a second bearing 110B may be configured to receive the second protrusion 104B, where the bearings 110A, 110B are fixed relative to the mounting portions 102A, 102B. The bearings 110A, 110B may be anti-rotation bearings that generally fix the support member 104 against rotation relative to the support mount 102, while allowing some movement of the support member 104 in the first direction L1. In one embodiment, as illustrated, the bearings 110A, 110B may be fixed within the openings 108A, 108B. However, in other embodiments, the bearings 110A, 110B may be positioned at any other suitable location on the support mount 102.

Additionally, the support assembly 100 may include a rotary bearing 112 configured to be coupled to the disk gang shaft 56 to allow the disk gang shaft 56 to rotate about the axis 56A relative to the toolbar 48. For example, the rotary bearing 112 may be received within the central body 104C of the support member 104 such that the axis 56A is perpendicular to the first direction L1. It should be appreciated that the rotary bearing 112 may be configured in any suitable manner. For instance, in one embodiment, as particularly shown in FIG. 4, the rotary bearing 112 may have an outer race configured to be received radially within the central body 104C and an inner race radially within the outer race and configured to rotate relative to the outer race, with the inner race being fixed to the shaft 56 (FIG. 3). However, in other embodiments, the rotary bearing 112 may have any other suitable configuration. For example, as shown in FIGS. 5 and 6, the central body 104C may form the outer race of the bearing 112.

During a tillage operation with the implement 10, normal draft loads or forces imparted by the disk(s) 46 on the support member 104 may cause the support member 104 to move slightly in the first direction L1 (e.g., rearward relative to the direction of travel 14) from a rest position. However, when one or more of the disk 46 hit an obstacle within the field (e.g., a rock), when one or more of the disk 46 are plugged (e.g., when field material accumulates between adjacent disks 46), or when one or more components of the support assembly 100 (e.g., the bearing(s) 110A, 110B, 112) start to fail, the support member 104 may experience greater loads and/or for different durations. Thus, in accordance with aspects of the present subject matter, one or more of the support assemblies 100 of the implement 10 may include a load sensor 120 supported by one of the first mounting portion 102A or the second mounting portion 102B that is configured to monitor the load applied on the support member 104 by the disk(s) 46. Particularly, the load sensor 120 may be configured to monitor the portion of the load acting along the first direction L1. The load sensor 120 may be configured as any suitable type of sensor. For instance, the load sensor 120 may be a load cell, a force transducer, and/or the like.

In one embodiment, as shown in FIGS. 4 and 5, the load sensor 120 is supported by the second mounting portion 102B. For instance, the load sensor 120 may be at least partially positioned within the opening 108B of the second mounting portion 102B. In such embodiment, the load sensor 120 may be contactable by the second protrusion 104B of the support member 104. Generally, in such embodiment, when the disk(s) 46 hits an obstacle or becomes plugged, the load sensor 120 detects a greater load than during normal operation.

In some embodiments, as shown in FIG. 6, the load sensor 120 is supported by the first mounting portion 102B. For instance, the load sensor 120 may be at least partially positioned within the opening 108A of the first mounting portion 102A. In such embodiment, the load sensor 120 may be contactable by the first protrusion 104A of the support member 104. Additionally, in such embodiments, the support member 104 may be biased by a biasing member 122 along the first direction L1 into contact with the load sensor 120 during normal operation or when the implement 10 is at rest. For instance, the biasing member 122 may be supported by the second mounting portion 102B, such as within the second opening 108B, and be configured to bias the support member 104 towards the first mounting portion 102A. It should be appreciated that the biasing member 122 may be any suitable biasing element, such as a spring and/or a compressible, elastic material, and/or may be positioned at any other suitable location. Generally, in such embodiment, when the disk(s) 46 hits an obstacle or becomes plugged, the load sensor 120 detects a smaller load than during normal operation. It should be appreciated with such embodiment that, the load sensor 120 may be protected against damage from large loads.

The load sensor 120 may be retained within the opening 108A, 108B via a retention plate 124. For instance, the load sensor 120 may be fixed to the retention plate 124, which, in turn, is fixed to the mounting portion 102A, 102B to position the load sensor 120 within the opening 108A, 108B. In some embodiments, a spacer (not shown) may be positioned between the retention plate 124 and the load sensor 120 to position the load sensor 120 closer to the support member 104 such that the sensor 120 is in contact with the support member 104 when the implement 10 is at rest and/or during normal operating conditions. An additional retention plate 124 may be similarly provided to retain the biasing member 122 relative to the support member (e.g., within the opening 108B of the support mount 102). Further, in some embodiments, a centering plate 126 may be provided to align the sensor 120 with coupling features (e.g., bore holes) of the retention plate 124.

It should be appreciated that, in some embodiments, each support assembly 100 is associated with a respective load sensor 120. In such embodiments, the change in loading across the disk gang 44, the toolbar 48, and/or width of the implement 10 may be determined. However, in some embodiments, only some of the support assemblies 100 are equipped with the respective load sensor 120, which reduces the cost of the overall system. Additionally, it should be appreciated that some of the support assemblies 100 of the implement 10 may have a respective sensor 120 supported by the first mounting portion 102 while other support assemblies 100 of the implement 10 may have a respective sensor 120 supported by the second mounting portion 102B.

Referring now to FIG. 7, a schematic view of one embodiment of a system 200 for monitoring operating conditions associated with disks of an agricultural implement is illustrated in accordance with aspects of the present subject matter. In general, the system 200 will be described herein with reference to the implement 10 described above with reference to FIGS. 1-2, the disk gang 44 described above with reference to FIG. 3, and the support assemblies 100 described with reference to FIGS. 4-6. However, it should be appreciated by those of ordinary skill in the art that the disclosed system 200 may generally be utilized with agricultural implements having any other suitable implement configuration, with ground engaging assemblies having any other suitable assembly/tool configuration, and/or with support assemblies having any other suitable configuration.

As shown in FIG. 7, the system 200 may include any combination of components of the agricultural implement 10 and/or the work vehicle 12 described above with reference to FIGS. 1-6. For instance, the system 200 may include: one or more sensors (e.g., the load sensor(s) 120) for generating data indicative of a load on the support assembly(ies) 100, one or more user interfaces (e.g., the user interface 220), one or more implement actuators (e.g., implement actuator(s) 49), and/or one or more drive devices (e.g., the engine 24 and/or the transmission 26). It should be appreciated that the user interface(s) 220 may include one or more feedback devices (not shown), such as display screens, speakers, warning lights, and/or the like. In addition, some embodiments of the user interface(s) 220 may include one or more input devices (not shown), such as touchscreens, keypads, touchpads, knobs, buttons, sliders, switches, mice, microphones, and/or the like, for allowing an operator to provide inputs to the system 200. Additionally, the system 200 may be communicatively coupled to one or more positioning sensor(s) 118 to determine the location of the implement 10 and/or the vehicle 12, such as a satellite navigation positioning device (e.g., a GPS system, a Galileo positioning system, a Global Navigation satellite system (GLONASS), a BeiDou Satellite Navigation and Positioning system, a dead reckoning device, and/or the like).

Additionally, as shown in FIG. 7, the system 200 may include a computing system 202 configured to electronically control the operation of one or more components of the agricultural implement 10. In general, the computing system 202 may comprise any suitable processor-based device known in the art, such as a computing device or any suitable combination of computing devices. Thus, in several embodiments, the computing system 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the computing system 202 may generally comprise memory element(s) including, but not limited to, a computer readable medium (e.g., random access memory RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the computing system 202 to perform various computer-implemented functions, such as one or more aspects of the methods and algorithms that will be described herein. In addition, the computing system 202 may also include various other suitable components, such as a communications circuit or module, one or more input/output channels, a data/control bus and/or the like.

Additionally, in some embodiments, the computing system 202 may be configured to include a communications module or interface 208 to allow for the computing system 202 to communicate with any of the various other system components described herein. For instance, as described above, the computing system 202 may, in several embodiments, be configured to receive data inputs from the load sensor(s) 120 and/or positioning device(s) 218, and to receive inputs from and/or provide control instructions to the user interface(s) 220, the implement actuator(s) 49, and/or the drive device(s) 24, 26. It should be appreciated that the computing system 202 may be communicatively coupled to the various components of the system 200 via any suitable connection, such as a wired or wireless connection.

In accordance with aspects of the present subject matter, the computing system 202 may be configured to monitor the operational status of the ground-engaging disk(s) 46 of the implement 10 during a tillage operation of the implement 10 (e.g., when the implement 10 is being moved across the field with the ground-engaging tools engaging the field). Specifically, in one embodiment, the computing system 202 may be configured to receive the data (hereinafter referred to as "load data") generated by the load sensor(s) 120 and determine or estimate a load applied on the support member 104 by the disk(s) 46 based on the load data. For instance, the computing system 202 may include a look-up table, suitable mathematical formula, and/or algorithms stored in its memory 206 that correlates the load data to the load acting on the support member 104 by the disk(s) 46.

The computing system 202 may then monitor the load acting on the support member 104 and/or a duration associated with such load relative to one or more thresholds associated with different operating conditions of the disk(s) 46. For instance, the computing system 202 may compare the load acting on the support member 104 to one or more normal operating load thresholds (e.g., a maximum normal operating load threshold(s) when the load sensor 120 is supported by the second mounting portion 102B as in FIGS. 4 and 5 or a minimum normal operating load threshold(s) when the load sensor 120 is supported by the first mounting portion 102A as in FIG. 6). If the load acting on the support member 104 does not cross the normal operating load threshold (e.g., does not exceed the maximum normal operating load threshold when the load sensor 120 is supported by the second mounting portion 102B as in FIGS. 4 and 5 or fall below the minimum normal operating load threshold when the load sensor 120 is supported by the first mounting portion 102A as in FIG. 6), then the disk(s) 46 are experiencing a normal operating condition. However, if the load acting on the support member 104 crosses the normal operating load threshold (e.g., exceeds the maximum normal operating load threshold when the load sensor 120 is supported by the second mounting portion 102B as in FIGS. 4 and 5 or falls below the minimum normal operating load threshold when the load sensor 120 is supported by the first mounting portion 102A as in FIG. 6), then the disk(s) 46 are not experiencing a normal operating condition.

The computing system 202 may further monitor whether the load acting on the support member 104 crosses the normal operating load threshold and continues to get further from the load threshold over time, without crossing back over the normal operating load threshold (e.g., further increases above the maximum normal operating load threshold or further decreases below the minimum normal operating load threshold). If the load acting on the support member 104 crosses and continues to get further from the load threshold (e.g., further increases above the maximum normal operating load threshold or further decreases below the minimum normal operating load threshold), the computing system 202 may determine that a plugged operating condition is present.

The computing system 202 may additionally, or alternatively, compare the duration or time associated with the load acting on the support member 104 crossing the normal operating load threshold to a threshold time. For instance, if the load crosses the normal operating threshold for a period of time less than the threshold time, the computing system 202 determines that the disk(s) 46 likely impacted an obstacle (e.g., rock) and that an obstacle impact condition is present. Conversely, if the load crosses the normal operating threshold for a period of time greater than the threshold time, the computing system 202 determines that the disk(s) 46 are likely plugged and that a plugged operating condition is present.

In some embodiments, the computing system 202 may directly compare the loads detected by the load sensor(s) 120 against each other to determine when the associated disk(s) 46 may be experiencing an abnormal operating condition. It should further be appreciated that, when the disk(s) 46 are part of a disk gang, such as the disk gang 44, and more than one of the support assemblies 100 configured to support the disk gang 44 is associated with a respective load sensor 120, the computing system 202 may be configured to determine the operating condition associated with the disk gang 44 based on the loads detected by each of the load sensors 120. For instance, in some embodiments, the computing system 202 may monitor the loads determined from the load data of each of the sensor(s) 120, then use the most significant load for each disk gang 44 (e.g., the largest of the loads on the support members 104 associated with the disk gang 44 when the load sensor 120 is supported by the second mounting portion 102B as in FIGS. 4 and 5 or the smaller of the loads on the support members associated with the disk gang 44 when the load sensor 120 is supported by the first mounting portion 102A as in FIG. 6) or an average of the loads for each disk gang 44 to determine the operating condition of the respective disk gang 44 using any of the comparisons described above. Additionally, it should be appreciated that the computing system 202 may make any individual or combination of the comparisons described above, as well as any other suitable comparisons to determine the operating condition of the disk(s) 46.

Based on the determined operating condition of the disk(s), the computing system 202 may further be configured to initiate one or more control actions based on the data received from the load sensor(s) 120. Specifically, the computing system 202 may be configured to control one or more components of the agricultural implement 10 and/or work vehicle 12 based on the operating condition of the disk(s) 46. For instance, in some embodiments, the computing system 202 may be configured to control an operation of the user interface(s) 220 to indicate to an operator the operating condition of the disk(s) 46 and/or disk gang(s) 44. In one or more embodiments, the computing system 202 may additionally, or alternatively, be configured to indicate to the operator via the user interface(s) 220 a location(s) of the field associated with the operating condition(s) based at least in part on data from the positioning sensor(s) 118. For instance, when the obstacle impact condition is determined, the computing system 202 may indicate location(s) in the field associated with an obstacle(s) so that the obstacle(s) may be removed before a subsequent operation in the field and/or so that a subsequent operation in the field may be adjusted to avoid the obstacle(s). Similarly, when the plugged operating condition is determined, the computing system 202 may indicate location(s) in the field where the disk(s) 46 might have not been properly working the field so that the area(s) of the field may be reworked and/or so that a subsequent operation in the field may be adjusted.

In one or more embodiments, when a plugged operating condition is determined, the computing system 202 may be configured to control an operation of the implement actuator(s) 49 to adjust a down force on the toolbar(s) 48 to attempt to reduce material accumulation. For instance, the computing system 202 may be configured to control the implement actuator(s) 49 to increase or decrease (or an alternating combination of both) a down force on the toolbar(s) 48 (and thus a penetration depth of the disk(s) 46) to reduce the material accumulation. Additionally, or alternatively, in some embodiments, the computing system 202 may be configured to control an operation of one or more vehicle drive components configured to drive the vehicle 12 coupled to the implement 10, such as the engine 24 and/or the transmission of the vehicle 12 based on the determined operating condition. For instance, when a plugged operating condition is determined, the computing system 202 may be configured to control the operation of the vehicle drive component(s) 24, 26, for example, to reduce a speed of the vehicle 12 and implement 10, in some cases, to bring the vehicle 12 and implement 10 to a stop. Similarly, if a certain number of obstacle impact conditions and/or a certain magnitude of obstacle impact conditions have been associated with the disk(s) 46 and/or disk gang 44, the computing system 202 may determine that the bearing(s) 110A, 110B, 112 associated with the disk(s) 46 may be worn and control the operation of the vehicle drive component(s) 24, 26 to slow down or stop the vehicle 12 and implement 10.

It should be appreciated that, in several embodiments, the computing system 202 may correspond to an existing computing system of the agricultural implement 10 and/or of the work vehicle 12 to which the implement 10 is coupled. However, it should be appreciated that, in other embodiments, the computing system 202 may instead correspond to a separate processing device. For instance, in one embodiment, the computing system 202 may form all or part of a separate plug-in module that may be installed within the agricultural implement 10 to allow for the disclosed system and method to be implemented without requiring additional software to be uploaded onto existing control devices of the agricultural implement 10.

Referring now to FIG. 8, a flow diagram of one embodiment of a method 300 for monitoring operating conditions associated with disks of an agricultural implement is illustrated in accordance with aspects of the present subject matter. In general, the method 300 will be described herein with reference to the implement 10 described above with reference to FIGS. 1-2, the disk gang 44 described above with reference to FIG. 3, the support assemblies 100 described with reference to FIGS. 4-6, and the system 200 described above with reference to FIG. 7. However, it should be appreciated by those of ordinary skill in the art that the disclosed method 300 may generally be utilized with agricultural implements having any other suitable implement configuration, with ground engaging assemblies having any other suitable assembly/tool configuration, with support assemblies having any other suitable configuration, and/or with any system having any other suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 8, at (302), the method 300 may include receiving data generated by a load sensor supported by one of a first mounting portion or a second mounting portion of a support mount supported relative to a frame member, the data being indicative of a load on a support member supported by the support mount relative to the frame member. For instance, as described above, the computing system 202 may be configured to receive data from the load sensor(s) 120 supported by one of the first mounting portion 102A or the second mounting portion 102B of the support mount 102 supported relative to a frame member (e.g., toolbar 48) of the implement 10, where the data is indicative of a load on the support member 104 supported by the support mount 102 relative to the toolbar 48.

Further, at (304), the method 300 may include determining an operating condition associated with a ground engaging disk supported relative to the frame member by the support member based at least in part on the data generated by the load sensor. For example, as discussed above, the computing system 202 may be configured to determine an operating condition (e.g., a normal operating condition, a plugged operating condition, an obstacle impact condition, and/or the like) based at least in part on the data generated by the load sensor(s) 120.

Additionally, at (306), the method 300 may include initiating a control action based at least in part on the operating condition. For instance, as discussed previously, the computing system 202 may be configured to initiate a control action (e.g., control an operation of the user interface(s) 220, the implement actuator(s) 49, the drive device(s) 24, 26, and/or the like) based at least in part on the operating condition determined from the data generated by the load sensor(s) 120.

It is to be understood that the steps of the method 300 are performed by the computing system 202 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 202 described herein, such as the method 300, is implemented in software code or instructions which are tangibly stored on a tangible computer readable medium. The computing system 202 loads the software code or instructions via a direct interface with the computer readable medium or via a wired and/or wireless network. Upon loading and executing such software code or instructions by the computing system 202, the computing system 202 may perform any of the functionality of the computing system 202 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural system for monitoring operating conditions associated with disks of an agricultural implement, the system comprising:

a frame member;

a support mount supported relative to the frame member, the support mount having a first mounting portion and a second mounting portion, the first and second mounting portions being at least partially spaced apart from each other in a first direction such that a gap is defined between the first and second mounting portions, the first mounting portion defining a first opening along the first direction, the second mounting portion defining a second opening along the first direction;

a support member supported relative to the frame member by the support mount, the support member being positioned in the gap defined between the first and second mounting portions, the support member having a first protrusion and a second protrusion extending opposite the first protrusion, the first protrusion being received within the first opening and the second protrusion being received within the second opening;

a shaft supported relative to the frame member by the support member;

a ground engaging disk supported on the shaft; and a load sensor supported by one of the first mounting portion or the second mounting portion of the support mount, the load sensor being configured to generate data indicative of a load on the support member, the load sensor being positioned within one of the first opening or the second opening, the load sensor being contactable by the first protrusion when the load sensor is positioned within the first opening, the load sensor being contactable by the second protrusion when the load sensor is positioned within the second opening.

2. The agricultural system of claim 1, further comprising a biasing element supported by the other of the first mounting portion or the second mounting portion, the support member being biased by the biasing element towards the load sensor along the first direction.

3. The agricultural system of claim 2, wherein the second mounting portion is positioned more rearward than the first mounting portion relative to a direction of travel, the load sensor being supported by the first mounting portion, and the biasing element being supported by the second mounting portion.

4. The agricultural system of claim 2, wherein the second mounting portion is positioned more rearward than the first mounting portion relative to a direction of travel, the load sensor being supported by the first mounting portion, and the biasing element being supported by the second mounting portion.

5. The agricultural system of claim 1, further comprising a computing system communicatively coupled to the load sensor, the computing system being configured to determine at least one of a plugged operating condition of the ground engaging disk or an obstacle impact condition of the ground engaging disk based at least in part on the data generated by the load sensor.

6. The agricultural system of claim 1, wherein the ground engaging disk is part of a disk gang, the agricultural system further comprising:

a second support mount supported relative to the frame member, the second support mount having a third mounting portion and a fourth mounting portion, the third and fourth mounting portions being at least partially spaced apart from each other in the first direction such that a second gap is defined between the third and fourth mounting portions;

a second support member supported relative to the frame member by the second support mount, the second support member being positioned in the second gap defined between the third and fourth mounting portions, the shaft being supported relative to the frame member by the second support member;

a second ground engaging disk supported on the shaft; and a second load sensor supported by one of the third mounting portion or the fourth mounting portion of the second support mount, the second load sensor being configured to generate data indicative of a load on the second support member by the ground engaging disk and the second ground engaging disk.

7. The agricultural system of claim 6, further comprising a computing system communicatively coupled to the load sensor and the second load sensor, the computing system being configured to determine an operating condition associated with the disk gang based at least in part on the data generated by the load sensor and the second load sensor.

8. The agricultural system of claim 7, wherein the operating condition comprises at least one of a plugged operating condition of the disk gang or an obstacle impact condition of the disk gang.

9. The agricultural system of claim 1, further comprising a retention plate coupled to the one of the first mounting portion or the second mounting portion of the support mount, the load sensor being coupled to the retention plate, the load sensor being supported by the one of the first mounting portion or the second mounting portion via the retention plate.

10. The agricultural system of claim 1, further comprising a hanger coupled to the frame member, the support mount being supported relative to the frame member by the hanger.

11. An agricultural method for monitoring operating conditions associated with disks of an agricultural implement, the agricultural implement comprising a frame member, a support mount supported relative to the frame member, the support mount having a first mounting portion and a second mounting portion at least partially spaced apart from the first mounting portion in a first direction such that a gap is defined between the first and second mounting portions, the agricultural implement further comprising a support member positioned in the gap and supported relative to the frame member by the support mount, and a ground engaging disk supported relative to the frame member by the support member, the method comprising:

receiving, with a computing system, data generated by a load sensor supported by one of the first mounting portion or the second mounting portion of the support mount, the data being indicative of a load on the support member, a biasing element being supported by the other of the first mounting portion or the second mounting portion, the support member being biased by the biasing element towards the load sensor along the first direction;

determining, with the computing system, an operating condition associated with the ground engaging disk based at least in part on the data generated by the load sensor; and initiating, with the computing system, a control action based at least in part on the operating condition.

12. The method of claim 11, wherein the second mounting portion is positioned more rearward than the first mounting portion relative to a direction of travel, the load sensor being supported by the first mounting portion, and the biasing element being supported by the second mounting portion.

13. The method of claim 11, wherein the operating condition is a plugged operating condition, wherein determining the plugged operating condition comprises determining a duration of time that the load crosses a load threshold and determining that the ground engaging disk is plugged when the duration of time is greater than a threshold time.

14. The method of claim 13, wherein, when the operating condition is the plugged operating condition, initiating the control action comprises at least one of controlling an operation of an implement actuator to adjust a position of the frame member, controlling an operation of a drive device to reduce a speed of the agricultural implement, or controlling a user interface to indicate the operating condition.

15. The method of claim 11, wherein the operating condition is an obstacle impact condition, wherein determining the obstacle impact condition comprises determining a duration of time that the load crosses a load threshold and determining that the ground engaging disk impacted an obstacle when the duration of time is less than a threshold time.

16. The method of claim 15, wherein, when the operating condition is the obstacle impact condition, initiating the control action comprises at least one of controlling an operation of a drive device to reduce a speed of the agricultural implement or controlling a user interface to indicate the operating condition.

17. The method of claim 11, wherein the ground engaging disk is part of a disk gang having at least one other ground engaging disk, each of the ground engaging disk and the at least one other ground engaging disk being supported on a shaft, wherein the support mount and the support member are part of a first support assembly of a plurality of support assemblies, each of the plurality of support assemblies coupling the shaft to the frame member, wherein the agricultural implement further includes at least one further load sensor, each of the at least one further load sensor being associated with a respective one of the plurality of support assemblies aside from the first support assembly, and wherein receiving the data generated by the load sensor comprises receiving data from the load sensor and each of the at least one further load sensor.

18. The method of claim 17, wherein the operating condition associated with the ground engaging disk is at least one of a plugged operating condition of the disk gang or an obstacle impact condition of the disk gang.

19. An agricultural system for monitoring operating conditions associated with disks of an agricultural implement, the system comprising:

a frame member;

a support mount supported relative to the frame member, the support mount having a first mounting portion and a second mounting portion, the first and second mounting portions being at least partially spaced apart from each other in a first direction such that a gap is defined between the first and second mounting portions;

a support member supported relative to the frame member by the support mount, the support member being positioned in the gap defined between the first and second mounting portions;

a shaft supported relative to the frame member by the support member;

a ground engaging disk supported on the shaft;

a load sensor supported by one of the first mounting portion or the second mounting portion of the support mount, the load sensor being configured to generate data indicative of a load on the support member; and a biasing element supported by the other of the first mounting portion or the second mounting portion, the support member being biased by the biasing element towards the load sensor along the first direction.

* * * * *